United States Patent Office 3,741,845
Patented June 26, 1973

3,741,845
DIELECTRIC BONDING OF THERMOPLASTIC MASSES
Eugene G. Castagna, Clark, N.J., assignor to Chevron Research Company, San Francisco, Calif.
No Drawing. Continuation-in-part of application Ser. No. 37,397, May 11, 1970, which is a continuation of application Ser. No. 681,076, Nov. 7, 1967, both now abandoned. This application Jan. 18, 1971, Ser. No. 107,425
Int. Cl. B29c 19/04
U.S. Cl. 156—273
5 Claims

ABSTRACT OF THE DISCLOSURE

Thermoplastic masses are dielectrically bonded by contacting in a dielectric bonding field with a blend of normally solid poly-1-alkene, such as polypropylene, and about 1 to 20% by weight of elastomeric polymer of acrylonitrile and butadiene.

CROSS REFERENCE TO RELATED APPLICATIONS

This application is a continuation-in-part of application Ser. No. 37,397, filed May 11, 1970 now abandoned, which, in turn, is a continuation of application Ser. No. 681,076, filed Nov. 7, 1967, now abandoned.

FIELD OF INVENTION

This invention is directed to novel dielectrically bondable poly-1-alkene compositions. More particularly it concerns compositions of poly-1-alkene and acrylonitrile/butadiene copolymer.

INVENTION BACKGROUND

Thermoplastic masses can be bonded together by dielectric techniques. Such techniques depend on the ability of a thermoplastic mass to heat and fuse when it is linked to an electric circuit. The bonding is effected by setting up an electric field in the thermoplastic of sufficient magnitude to heat the material to at least its fusion temperature. The desired bonding areas of the masses are pressed together in order to insure an adequate seal. Thereafter, the electric field is terminated and the bond is allowed to cool and solidify. This technique works best with polar thermoplastics such as polyvinyl chloride, which have high loss tangents at dielectric bonding frequencies. Low loss tangent thermoplastics such as poly-1-alkenes, are not, without modification, dielectrically sealable on a practical basis.

Theoretically, polyalkenes can be modified with high loss tangent fillers so that the composite material will have a high loss tangent. The difficulty in applying this theory lies in finding a suitable filler. This is not solved by merely selecting a filler having a high loss tangent which forms a homogeneous mixture with the poly-1-alkene before the electric field is connected. In order to be useful, the composite material must also remain stable and homogeneous at the temperatures generated by the electric field. If a filler exudes from the composite when the composite is subjected to the field, a poor, weak bond will result. There is no apparent way to predict whether a filler will be compatible with a polyalkene under such conditions.

Still another problem exists if it is desirable that the composite material remain clear or opaque. In this instance a filler is insufficient if it colors the polyalkene either before, during or after the composite is subjected to the electric field. Unless a proposed filler is such that it will obviously color the polyalkene, e.g., carbon black, there is similarly no apparent way to predict its effect on the polyalkene's color.

INVENTION DESCRIPTION

It has now been found that particular acrylonitrile/butadiene copolymers may be blended with poly-1-alkenes to give a composite material which can be bonded dielectrically without stability or coloring problems. These blends comprise a substantially crystalline poly-1-alkene of monomers having 2 to 6 carbon atoms and about 1 to 20% by weight elastomeric acrylonitrile/butadiene copolymer having a number average molecular weight of at least about 50,000 and an acrylonitrile/butadiene weight ratio of at least about 15:85. Preferably the copolymer is present in amounts varying from about 5 to 15% by weight. Preferred acrylonitrile/butadiene copolymers have number average molecular weights in the range of about 50,000 and 100,000 and an acrylonitrile/butadiene weight ratio in the range of about 20:80 and 40:60.

The substantially crystalline poly-1-alkene of the compositions in this invention are extrudable or moldable solids having molecular weights of at least about 20,000. Preferred poly-1-alkenes are polypropylene and polyethylene. Polypropylene is particularly preferred. Examples of other poly-1-alkenes of this group are poly-1-butene and poly-4-methyl-1-pentene. Physical mixtures and copolymers of these poly-1-alkenes may also be used.

These poly-1-alkenes may be made by known methods using Ziegler-type catalysts. Such coordination catalysts usually comprise an organoaluminum compound and a transition metal halide. The organoaluminum compounds are usually alkyl aluminums or alkyl aluminum halides in which the alkyl groups each contain about 1 to 6 carbon atoms and the halogen is chlorine or bromine. Examples of such compounds are trimethyl-aluminum, triethylaluminum, tributylaluminum, trihexylaluminum, dimethylaluminum chloride, diethylaluminum bromide, dibutylaluminum chloride and dihexylaluminum bromide. The transition metal halide will usually be a chloride or bromide of titanium. A particularly effective catalyst combination is dialkylaluminum chloride with activated violet titanium trichloride.

The butadiene/acrylonitrile copolymers of the compositions of this invention are well known and available commercially. These oil-resistant, rubbery copolymers are generally prepared by copolymerizing acrylonitrile and butadiene in an aqueous emulsion containing a surfactant and a free-radical catalyst. Water soluble free-radical catalysts such as alkali metal persulfates and alkali metal perborates are used in such copolymerizations. These copolymerizations are usually run at temperatures in the range of about 0 to 150° C. The reaction product—a copolymer latex—is coagulated, precipitated, washed and purified. The molecular weights and weight ratios of monomers in these copolymers are dependent upon the ratio of monomers fed to the reaction as well as the catalyst and polymerization conditions.

The acrylonitrile/butadiene copolymer and the poly-1-alkene may be blended by known means. Conventional blending apparatus such as powder or melt blenders may be used to give a homogeneous, masticated mixture of the copolymer and poly-1-alkene.

After blending the poly-1-alkene and copolymer the blend is molder or extruded into a desired shape. Additives and stabilizers which facilitate extrusion or molding may be incorporated into the blend. Depending on the end use of the composition, other stabilizers such as ultraviolet stabilizers, pigments and the like may be added to the blend. Usually the blend will be formed into a product which is an integral part of an article which is to be assembled by dielectric bonding. However, the blend may also be formed into thin tapes or ribbons which are to be affixed to or laid between the interface of two bonding areas of compatible thermoplastic materials. In this latter use, it is desirable that the articles to be bonded be made of the same poly-1-alkene as is present in the blend.

The apparatus for assembling and bonding thermoplastic masses dielectrically is available commercially. The electrical source is, in essence, an alternating current generator. It is usually in the 25 to 100 megacycle range. This apparatus is connected to the mass to be heated. The mass acts as a capacitance load and the apparatus is usually designed such that a maximum voltage is achieved across the load.

In using the compositions of this invention the articles to be bonded are joined and appropriately coupled to the apparatus. A current of sufficient frequency is generated to cause the surfaces at the joint to heat and fuse. For polypropylene the frequency should be such that the joint is heated to about 375–450° F. After fusion is accomplished—usually within a matter of seconds—the circuit is broken and the joint is held together until the polymer solidifies.

EXAMPLES

The following examples are offered to illustrate this invention. They are in no way intended to limit the invention otherwise described and claimed herein. Percentages are by weight unless indicated otherwise.

EXAMPLE 1

90 parts commercial, substantially crystalline polypropylene powder were blended with 10 parts of a commercial elastomeric acrylonitrile/butadiene copolymer (40% acrylonitrile; number average M.W. 50,000–100,000) containing 0.5 part octylated diphenylamine in a Banbury blender. The loss tangent of this colorless blend was determined to be about 0.03 at both 30 and 60 megacycles, ambient temperature. The blend was molded in small flat strips. Pairs of these strips were placed between the electrodes of a 3 kw. dielectric sealing machine and bonded at 60–70 megacycles. Overlap bonds and bar-type bonds were made in this manner. All the bonds were strong and could not be separated by hand. There was no evidence of the copolymer exuding from the blend or significant discoloration.

EXAMPLE 2

In the manner described in Example 1 strips were made from a blend of 2625 parts polypropylene, 375 parts acrylonitrile/butadiene copolymer (ca. 40% acrylonitrile, 50,000–100,000 number average M.W.) and 60 parts thixotropic microsilica. These strips were bonded together as described in Example 1. Again, there was no evidence of significant discoloring or copolymer exudation. All bonds were strong and continuous.

EXAMPLE 3

In the manner described in Example 1, strips were made from a blend of 90 parts polypropylene, 10 parts acrylonitrile/butadiene copolymer, 0.5 part dilauryl thiodipropionate, 0.1 part thio-bisphenol and 0.1 part tri(mixed mono- and dinonyl) phenyl phosphite. The strips were bonded together as in Example 1. There was no evidence of copolymer exudation or significant discoloration. The bonds were strong and continuous.

While the character of this invention has been described in detail with numerous examples, this has been done by way of illustration only and without limitation of the invention. It will be apparent to those skilled in the art that modifications and variations of the illustrative examples may be made in the practice of the invention within the scope of the following claims.

I claim:

1. In the dielectric bonding of substantially crystalline poly-1-alkene thermoplastic solid masses the improvement which comprises bringing the bonding areas of said thermoplastic solid masses into contact in a dielectric bonding field with a composition comprising an initimate physical blend of normally solid, substantially crystalline poly-1-alkene of monomers having 2 to 6 carbon atoms and about 1 to 20 percent by weight of elastomeric polymer of acrylonitrile and butadiene having a number average molecular weight in the range of about 50,000 and 100,000 and a weight ratio of acrylonitrile to butadiene in the range of about 20:80 and 40:60.

2. The dielectric bonding, in accordance with claim 1, in which the monomers of the poly-1-alkene contain 2 to 3 carbon atoms.

3. The dielectric bonding, in accordance with claim 1, in which the poly-1-alkene is polypropylene.

4. The dielectric bonding, in accordance with claim 1, in which the composition is in the form of a shaped article.

5. The dielectric bonding, in accordance with claim 1, in which the poly-1-alkene blend is in the form of thin tapes or ribbons between the interface of the bonding areas of said thermoplastic solid masses.

References Cited

UNITED STATES PATENTS 3,336,173   8/1967   Renfroe _____ 156—273
3,407,253   10/1968  Yoshimura et al. ____ 260—889

DOUGLAS J. DRUMMOND, Primary Examiner